United States Patent [19]

Hughes

[11] Patent Number: 4,580,754

[45] Date of Patent: Apr. 8, 1986

[54] APPARATUS FOR MOUNTING AN APPLIANCE UNDER A CABINET OR THE LIKE

[75] Inventor: Edward H. Hughes, Clinton, N.Y.

[73] Assignee: General Electric Company, Portsmouth, Va.

[21] Appl. No.: 608,898

[22] Filed: May 10, 1984

[51] Int. Cl.[4] .............................................. A47F 5/01
[52] U.S. Cl. .................................. 248/285; 248/287; 248/323; 248/201
[58] Field of Search ............... 248/296, 285, 201, 317, 248/324, 323, 327, 287; 312/245, 330, 72, 13, 11, 333

[56] References Cited

U.S. PATENT DOCUMENTS

| | | | |
|---|---|---|---|
| 634,464 | 10/1899 | Kent | 248/323 |
| 1,244,879 | 10/1917 | Martin | 248/323 |
| 2,696,962 | 12/1954 | Gross | 248/201 |
| 2,986,366 | 5/1961 | Wesson | 248/285 |
| 3,087,118 | 4/1963 | Goffstein | 248/317 |
| 3,371,976 | 3/1968 | Ritz, Jr. | 312/245 |
| 3,574,340 | 4/1971 | Beesche | 248/285 |
| 3,698,780 | 10/1972 | Collins et al. | 312/245 |
| 4,079,604 | 3/1978 | Aderegg | 70/58 |
| 4,140,355 | 2/1979 | Swain | 312/330 R |
| 4,314,734 | 2/1982 | Grunert | 312/333 |
| 4,492,417 | 1/1985 | Saito | 312/13 |

FOREIGN PATENT DOCUMENTS 2214424 10/1973 Fed. Rep. of Germany .
646477 2/1979 U.S.S.R. ............................ 248/201

Primary Examiner—Reinaldo P. Machado
Assistant Examiner—Alvin Chin-Shue

[57] ABSTRACT

A mounting arrangement is provided for supporting an appliance such as a television set from the undersurface of a structure such as a kitchen cabinet. The mounting apparatus permits adjustment of the appliance relative to the cabinet in three modes. The three modes include movement along a vertical axis, movement along a horizontal axis, and rotational movement about a vertical axis.

4 Claims, 15 Drawing Figures

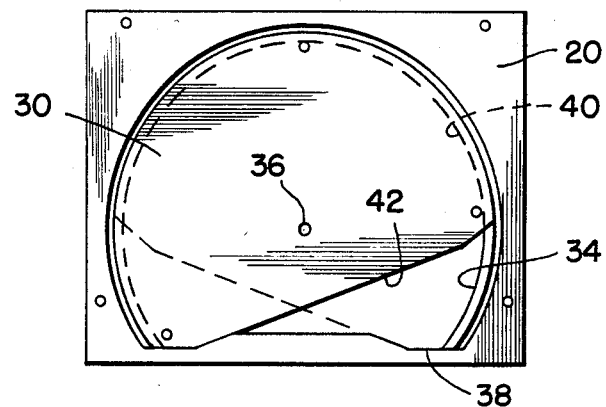
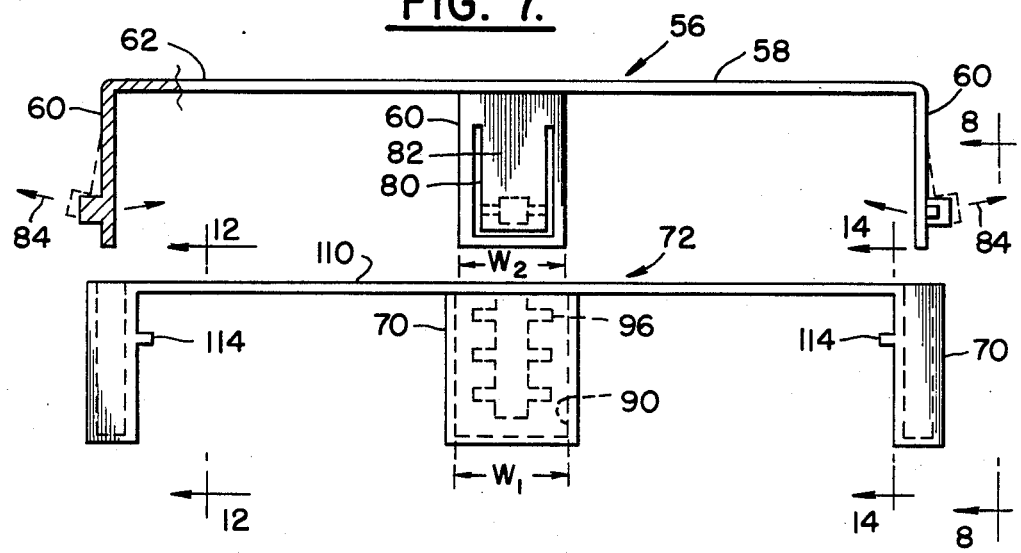
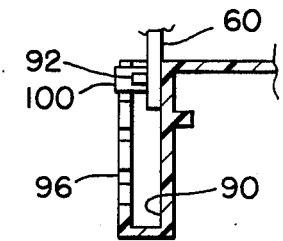 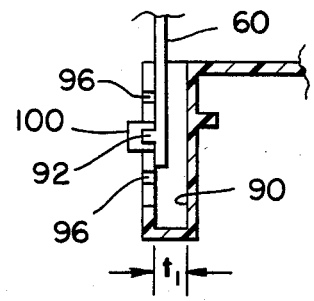

APPARATUS FOR MOUNTING AN APPLIANCE UNDER A CABINET OR THE LIKE

BACKGROUND OF THE INVENTION

1. Field of the Invention

This invention relates to apparatus for mounting an appliance such as a television set under a cabinet or the like and, more particularly, to a mounting apparatus which permits the position of the appliance to be adjusted vertically, horizontally and rotationally with respect to the undersurface of the cabinet.

2. Description of the Prior Art

Various arrangements have been proposed in the past for mounting appliances such as radios or tape players under kitchen cabinets or the like. U.S. Pat. No. 3,698,780 discloses a mounting arrangement for supporting a radio receiver from the lower surface of a kitchen cabinet. The mount provides for vertical adjustment of the radio receiver relative to the bottom wall of the cabinet. U.S. Pat. No. 3,371,976 discloses an arrangement for mounting a stereo cartridge holder beneath an automobile dashboard in a manner such that the cartridge holder can be adjusted not only vertically, but also horizontally in a forward-rearward direction. U.S. Pat. No. 4,079,604 provides means for mounting a citizens band radio on the underside of a dashboard in a manner such that the radio can be adjusted both rotationally about a vertical axis and horizontally in a forward-rearward direction. It is also known in the prior art to mount television sets or the like for rotational movement about a vertical axis.

SUMMARY OF THE INVENTION

It is a primary object of this invention to provide an improved mounting arrangement for supporting an appliance such as a television set from the undersurface of a kitchen cabinet or the like.

Another object is to provide a mounting arrangement for mounting a television set on the undersurface of a cabinet or the like such that the position of the television set may be adjusted not only for viewing ease, but also for accommodation to the physical characteristics of the cabinet.

Yet another object of the invention is to provide a mounting arrangement for an appliance whereby the appliance may be mounted on the undersurface of a cabinet or the like and adjusted relative thereto vertically, horizontally, and rotationally about a vertical axis.

Briefly stated, in carrying out the invention in one form, a mounting apparatus is provided for supporting an appliance such as a television set on the undersurface of a structure such as a kitchen cabinet in a manner such that the appliance may be adjusted relative to the undersurface in three modes comprising (1) movement along a vertical axis, (2) movement along a horizontal axis, and (3) rotational movement about a vertical axis. The mounting apparatus includes first, second, and third support elements. The first support element is secured to the undersurface in a fixed position. The second support element is secured to the first support element, the first and second support elements including complementary means for permitting adjustment of the second support element relative to the first support element in a first one only of the three modes. The third support element is secured to the second support element, the second and third support elements including complementary means for permitting adjustment of the third support element relative to the second support element in a second one only of the three modes. The third support element further includes means adapted to support the appliance and to coact with complementary means on the appliance for permitting adjustment of the appliance relative to the third support element in a third one only of the three modes. In accordance with a further aspect of the invention, rotational movement about a vertical axis is provided by two of the support elements, one having an opening therein and the other having a disk received in the opening for rotational movement therein. The disk has in a given horizontal plane a periphery comprising at least an arcuate portion having a constant radius, and the opening having in the same horizontal plane a periphery comprising at least an arcuate portion having a constant radius slightly greater than the radius of the disk to permit the disk to be received in the opening. The two support elements further include means for vertically retaining the disk in the opening such that the disk may be rotated within the opening. Preferably, the periphery of the disk comprises the arcuate portion and an interconnecting portion joining the ends of the arcuate portion. The included angle of the arcuate portion about its center of radius is substantially greater than 180 degrees, and the distance between any point on said interconnecting portion intermediate its ends and the center of radius is less than the constant radius of the arcuate portion. Similarly, the periphery of the opening comprises the arcuate portion and an interconnecting portion joining the ends of the arcuate portion. The included angle of the arcuate portion about its center of radius is substantially greater than that of the disk, and the distance between any point on the interconnecting portion of the opening intermediate its ends and the center of radius is less than the constant radius of the arcuate portion of the disk. In this manner, the disk may be rotated within the opening through an angle substantially equal to the included angle of the opening less the included angle of the disk.

By further aspects of the invention, the opening is provided in the first support element, and the second support element comprises the disk and a bracket located below the first support element. Movement along the vertical axis provided by the second and the third support elements, one including a plurality of spaced-apart vertically extending guiding means and the other including an equal plurality of spaced-apart vertically extending guided means each operatively received by a respective one of the guide means such that the second and third support element can be moved vertically with respect to each other. At least one pair of the guiding and guided means includes multi-position locking means for selectively locking the two support elements in any one of a plurality of relative vertical positions. The vertical locking is preferably provided by a resilient finger on the guided means adapted to selectively engage locking slots provided in the guiding means. The third support element includes horizontal track means for cooperating with complementary means on the appliance to position the appliance horizontally. Preferably the track means comprises laterally spaced-apart inwardly facing horizontal ribs adapted for sliding reception in complementary outwardly facing grooves in the appliance. Detents are provided for horizontally positioning the appliance relative to the third support member.

BRIEF DESCRIPTION OF THE DRAWINGS

While the novel features of the invention are set forth with particularity in the appended claims, the invention, both as to organization and content, will be better understood and appreciated, along with other objects and features thereof, from the following description taken in connection with the drawings, in which:

FIG. 6 is a view similar to FIG. 5 showing the full range of rotational movement about a vertical axis of the second support element relative to the first support element;

FIG. 7 is an exploded view of the bracket portion of the second support element and the third support element;

FIG. 10 is a cross-sectional view taken along viewing line 10—10 of FIG. 8;

FIG. 11 is a cross-sectional view taken along viewing line 11—11 of FIG. 9;

DESCRIPTION OF A PREFERRED EMBODIMENT

Figure 1:
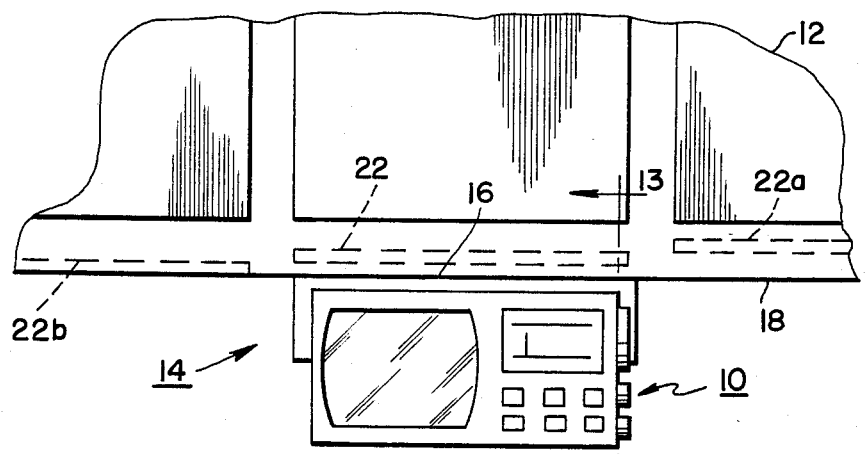
FIG. 1 shows a television set mounted under a kitchen cabinet by mounting apparatus incorporating the present invention.

FIG. 1 illustrates a television set 10 mounted beneath a set of kitchen cabinets 12 by the mounting apparatus of this invention, the mounting apparatus being indicated generally by the numeral 14. In accordance with the invention, the television set 10 is mounted such that it can be swivelled, or rotated about a vertical axis through a substantial range of positions to provide a comfortable viewing angle from various parts of the room. To permit such rotational adjustment of the television set 10, the mounting apparatus 14 must adjustably support the television set in a vertical mode such that its upper surface 16 is below the lowermost portion of the cabinet, this normally being the lower edge 18 of the front trim of the cabinet. This arrangement assures that the cabinet will not vertically interfere with rotation of the television set. Moreover, to assure that the wall behind the cabinet does not interfere with free rotation of the television set 10, the mounting arrangement 14 of this invention provides for horizontal adjustment of the television set in a fore and aft direction.

Figure 3:
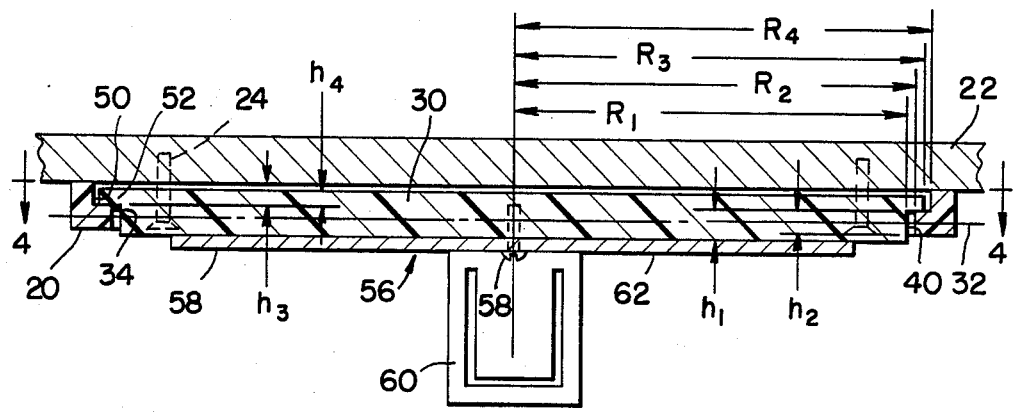
FIG. 3 is a front view showing the first and second support elements of the mounting apparatus secured to the undersurface of the cabinet, the view being taken along viewing line 3—3 of FIG. 5.
Figure 4:
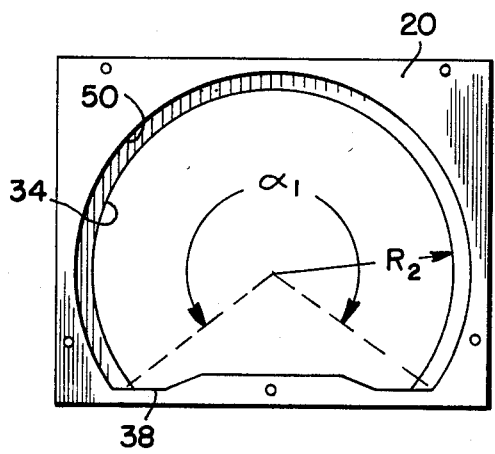
FIG. 4 is a top view of the first support element only taken along viewing line 4—4 of FIG. 3.
Figure 2:
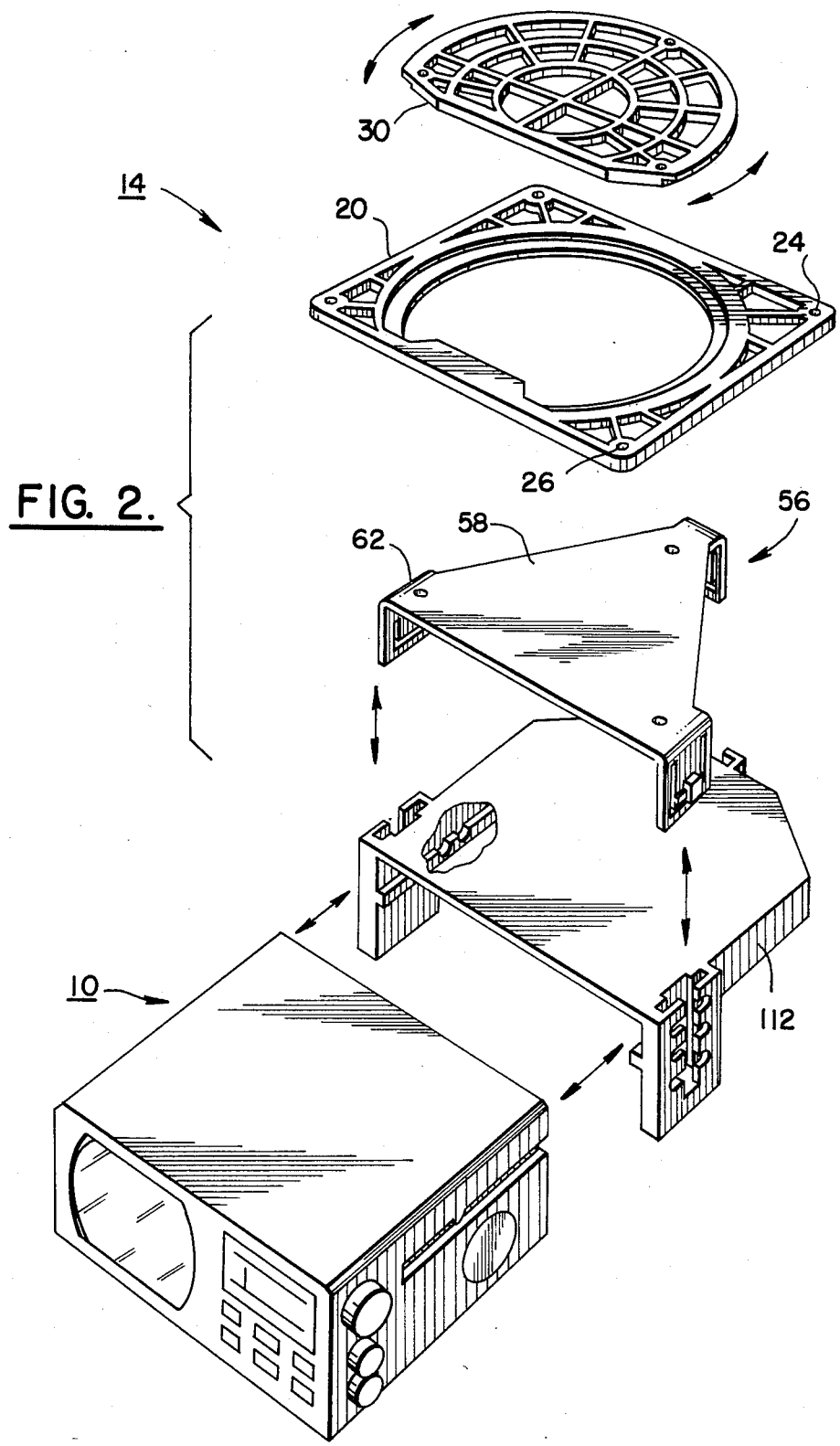
FIG. 2 is an exploded perspective view of the mounting arrangement of FIG. 1.
Figure 8:
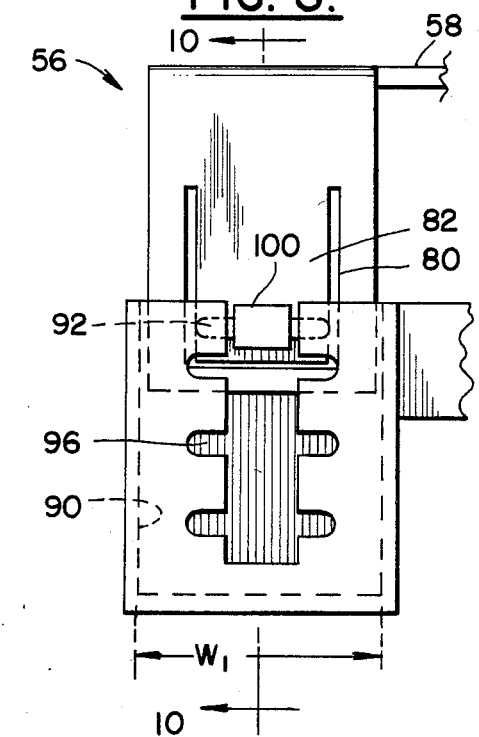
FIG. 8 is a view taken along viewing line 8—8 of FIG. 7 showing the guided tab of the bracket portion of the second support element entering the guiding means of the third support element.
Figure 9:
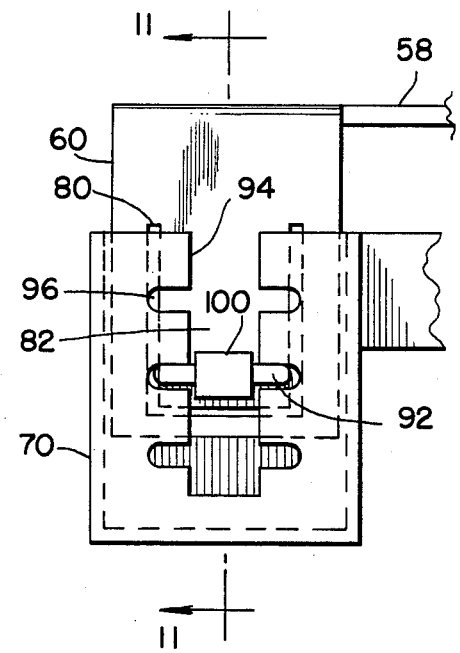
FIG. 9 is a view similar to FIG. 8 showing the guided tab locked in a selected position in the guiding means.

With reference to FIGS. 1 through 3, the mounting apparatus 14 includes a first support element 20 which is bolted or otherwise fixedly secured to the undersurface of the lower wall 22 of the cabinet. As shown, the lower wall 22 is normally recessed such that its undersurface is at a height one to two inches above the lower edge 18 of the front trim. The amount of recess is, however, not uniform from cabinet to cabinet, and the amount of recess may be greater as shown by 22a or even nonexistent as shown by 22b. The vertical adjustment feature of the present invention accommodates such variations in the manner described below to position the upper surface 16 of the television set 10 below the lowermost portion of the cabinet 12.

Referring now to FIGS. 2-6, the first support element 20 may be permanently fixed to the undersurface of the lower wall 22 by means of bolts 24 or the like passing through openings 26 in the first support element 20. The first support element 20 may be formed of a flat, substantially solid piece of material such as plastic as illustrated by FIGS. 3-6. Alternatively, it may be formed from material having a honeycomb construction as illustrated by FIG. 2. The advantage of the honeycomb construction resides in its providing the required rigidity and strength with less material. A disk 30 received in the first support element 20 similarly may be made either solid as shown by FIGS. 3-6 or of honeycomb construction as shown by FIG. 2. The material advantage noted above can provide significant cost savings when the parts 20 and 30 are molded of plastic on a large volume basis. The solid or honeycomb construction of the parts 20 and 30 does not, however, form a part of the present invention.

The first support element 20 has an opening formed therein, the opening having in a horizontal plane 32 a periphery comprising an arcuate portion 34 having a constant radius $R_2$. The included angle $\alpha_1$ of the arcuate portion 34 about its center of radius 36 is approximately 240° degrees. The opposite ends of the arcuate portion 34 are interconnected by an interconnecting portion 38. The distance between any point on the interconnecting portion 38 intermediate its ends is less than the radius $R_2$ of the arcuate portion 34. The disk 30 forms a portion of a second support element, the disk being designed to fit within the opening of the element 20 in the manner shown by FIGS. 3, 5 and 6. More particularly, the disk 30 has a periphery in the horizontal plane 32 comprising an arcuate portion 40 and an interconnecting portion 42. The arcuate portion 40 has a constant radius $R_1$ that is slightly smaller than $R_2$, and the included angle $\alpha_2$ of the arcuate portion 40 about the center of radius is approximately 200° degrees. The distance between any point on the interconnecting portion 42 intermediate its ends is less than the radius $R_1$ of the arcuate portion 40. The upper surface of the first support element has an arcuate, rabbeted portion 50 therein having the same included angle $\alpha_1$ as the arcuate portion 34 and a constant radius $R_4$ slightly greater than the radius $R_2$ of the arcuate portion 34. The disk 30 has an upper, arcuate lip 52 having the same included angle $\alpha_2$ as the arcuate portion 40 and a radius $R_3$ slightly larger than the radius $R_2$ of the opening in the first support element 20, but smaller than the radius $R_4$ of the rabbeted arcuate portion 50. The lip 52 thus projects outwardly of the arcuate portion 34 of the first support element 20 to prevent downward movement of the disk 30 relative to the first support element 20. In this respect, the included angle $\alpha_2$ of the disk 30 must be substantially greater than 180 degrees to assure that the disk 30 cannot shift significantly in a fore and aft direction within the opening in the first support element 20. Otherwise, the included angles $\alpha_1$ and $\alpha_2$ may vary substantially from the nominal values given above in order to provide a desired range of viewing angles in the manner discussed below.

Figure 5:
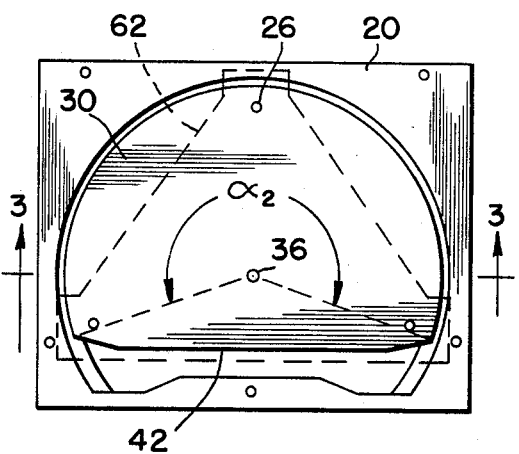
FIG. 5 is a view similar to FIG. 4 showing both the first and second support elements in their assembled position.

As best shown by FIGS. 2, 3, 5, and 7, the second support element further includes a bracket 56 of resilient material, such as a resilient plastic or metal. The bracket 56 includes a horizontal flat portion 58 secured to the lower side of the disk 30 by screws or the like. The bracket 56 includes three depending blade members 60, which will be described later. As best shown by FIG. 5, the bracket 56 includes portions 62 which extend radially beyond the arcuate portion 34 and terminate at their radially outward ends in the blade members 60. By extending radially beyond the arcuate portion 34, the bracket portions 62 prevent upward movement of the disk 30 relative to the first support member 20.

In accordance with the invention, the disk 30 may be rotated, or swivelled, within the first support element 20 between the two extreme positions illustrated by FIG. 6. More specifically, the disk 30 may be rotated in the counterclockwise direction, as shown by solid lines in FIG. 6, until the left ends of the interconnecting portions 38 and 42 abut to prevent further rotation. Similarly, the disk 30 can be rotated in the clockwise direction, as shown by broken lines in FIG. 6, until the right ends of the interconnecting portions 38 and 42 abut. As indicated in FIG. 6, the total possible rotation of the disk 30 within the first support element 20 is equal to the difference between the included angle $\alpha_1$ of the arcuate portion 34 of the opening about the center of radius 36 and the included angle $\alpha_2$ of the arcuate portion 40 of the disk 30. As will become clear as this description proceeds, the television set 10 is rotationally fixed to the disk 20 and may thus be rotated through the angle $(\alpha_1 - \alpha_2)$, or in the illustrated embodiment 240°. The included angles $\alpha_1$ and $\alpha_2$ are selected to provide the desired range of viewing angles, subject to the requirement stated above that the included angle $\alpha_2$ be substantially greater than 180 degrees to assure that the disk 30 cannot shift significantly in a fore and aft direction within the opening.

To permit rotation of the disk 30 within the opening of the first support element 20, the vertical height $h_1$ (FIG. 3) of the arcuate portion 40 of the disk 30 is made slightly greater than the height $h_2$ of the arcuate portion 34 of the first support element 20. Similarly, the height $h_3$ of the rabbeted portion 50 is made slightly greater than the height $h_4$ of the lip 52. As a result, there can be no binding between the disk 30 and the first support element 20 when the bracket 56 is secured to the disk 30. The weight of the television set 10 applied to the disk 30 through the bracket 56 will assure, however, adequate frictional engagement in a vertical direction between the lip 52 and the arcuate portion 34 to maintain any selected rotational positions of the television set.

The vertical adjustment feature of the invention will now be described with reference to FIGS. 2, 3, and 7 through 11. The three blade members 60 of the bracket 56 comprise guided means which are received in three respective channel members 70 of a third support element 72, the channel members comprising guiding means. Each of the blade members 60 is of rectangular configuration with its vertical dimension (depending from the bracket portion 62) somewhat greater than its horizontal dimension. A cut-out 80 of generally U-shaped configuration within the blade member 60 forms a depending finger 82. Because of the resiliency of the plastic forming the bracket 56 including the blade member 60, the finger 82 may be resiliently flexed relative to the remainder of the blade member 60 as illustrated generally by the arrows 84 of FIG. 7. This resiliency is utilized to provide locking of the second and third support elements in any one of a plurality of relative vertical positions.

Each of the channel members 70 has a vertically extending channel 90 having, as shown by FIG. 7, a width $w_1$ slightly larger than the width $w_2$ of the blade member 60. As shown by FIGS. 10 and 11, the channel 90 has a thickness $t_1$ slightly greater than the thickness of the blade member 60 including locking tabs 92 projecting outwardly from the outer surface of the resilient finger 82. As shown by FIGS. 2, 3, and 7 through 11, each channel 90 has a vertically extending slot 94 therein, from which a plurality of vertically spaced-apart slots 96 extend horizontally outward therefrom. The slots 96 are adapted to receive the locking tabs 92 on the resilient fingers 82 to lock the second and third support elements in selected relative vertical positions. More particularly, the resilient fingers 82 are normally biased to the left to a first position as viewed in FIG. 11. By applying pressure on a button 100 intermediate the tabs 92 to bias the finger 82 to the right to a second position, the tabs 92 clear the wall containing the slots 96 as shown by FIG. 10, and the blade element 60 can be moved into the channel 90 until the tabs 92 are aligned with the desired set of slots 96. Pressure on the button 100 is then released, and the finger 82 moves the tabs 92 into the aligned slots 96 to lock the bracket 56 (part of the second support element along with the disk 30) in a desired vertical position relative to the third support element 72. In this manner, the vertical height of the television set 10 can be fixed at a desired location relative to the cabinet 12 (FIG. 1).

Figure 12:
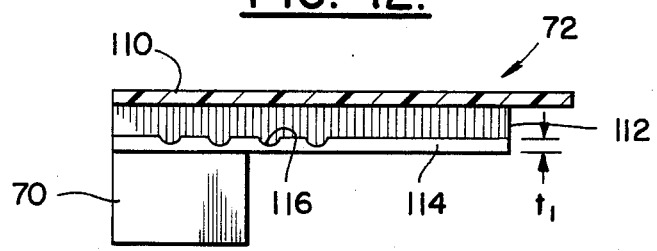
FIG. 12 is a view of a portion of the third support element taken along viewing line 12—12 of FIG. 7.
Figure 13:
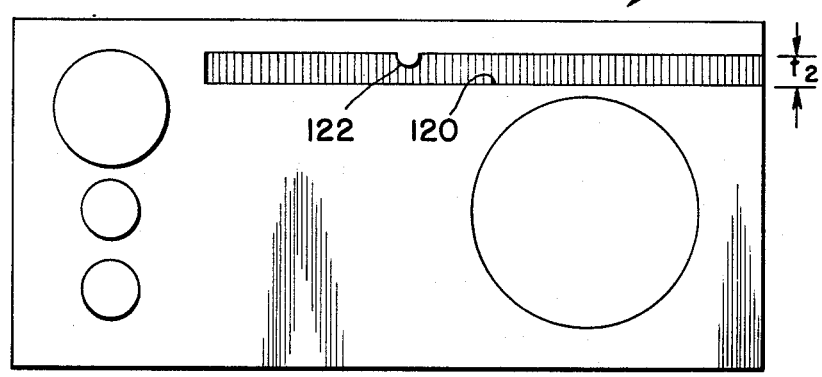
FIG. 13 is a side view of the television set taken along viewing line 13—13 of FIG. 1.
Figure 14:
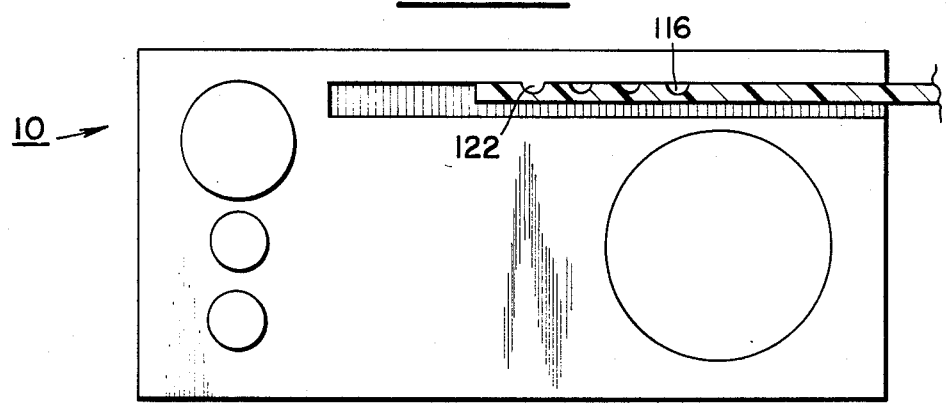
FIG. 14 is a view of the television set of FIG. 13 in one mounted position, the view being taken along viewing line 14—14 of FIG. 7.
Figure 15:
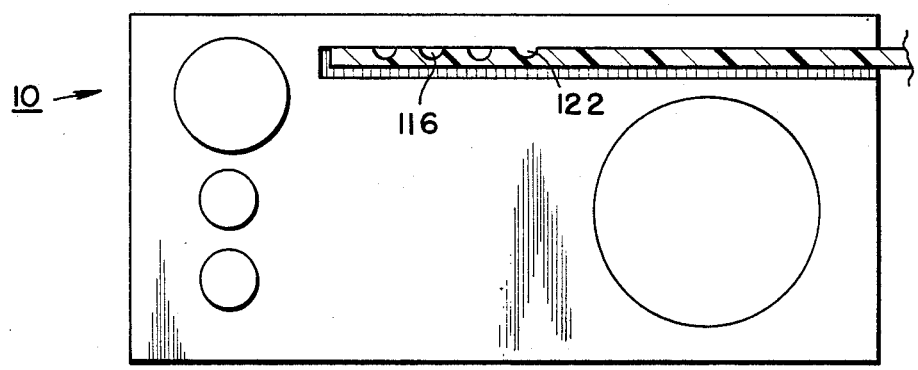
FIG. 15 is a view similar to FIG. 14 showing the television set in another mounted position.

Referring now to FIGS. 2, 7, and 10 through 15, the horizontal adjustment feature of the invention will be described. The third support element 72 has a generally flat upper surface 110 interconnecting and supporting the channel member 70. A side wall 112 extends rearwardly, as best shown by FIGS. 2 and 12, from the two side channel members 70. The side walls 112 are parallel to each other, and the side walls 112 include a pair of laterally spaced-apart horizontal ribs 114. The inwardly facing ribs 114 have a plurality of horizontally spaced-apart depressions 116 in the upper surface thereof. The television set 10 has, as best shown by FIGS. 2 and 13, in each side thereof an outwardly facing horizontal groove 120 adapted to receive the respective rib 114 in horizontal sliding relationship. The grooves 120 have a single depending projection 122 in the upper surface thereof adapted to selectively engage the depressions 116 in the ribs 114 to locate the television set 10 in any one of a plurality of horizontal positions relative to the third support element 72 and the rest of the mounting arrangement. The depressions 116 and the projections 122 thus provide detents for horizontal adjustment of the television set 10 in a fore and aft direction. To permit the horizontal movement of the television set 10 relative to the third support element 72, the thickness $t_1$ (FIG. 12) of the ribs 114 is less than the thickness $t_2$ (FIG. 13) of the groove 120 less the vertical height of the projections 122. In this manner, the television set 10 can be lifted slightly such that the projection 122 clear the upper surfaces of the ribs 114, and the set 10 can then be moved horizontally to the desired position or removed from the mounting means. When the set 10 is lowered, the projections 122 will enter the respective set of depression 116 to relatively lock the television set 10 into the desired position.

Although a preferred embodiment of the invention has been shown and described, modifications and alternatives will be readily apparent to those skilled in the art. For example, the horizontal track means comprising the ribs 114 and grooves 120 may be modified by eliminating the detent means therefrom. In such case, horizontal positioning will be retained by the frictional engagement between the engaging ribs and grooves.

From the foregoing, it will be seen that the present invention provides a mounting arrangement for mounting an appliance such as a television set beneath a cabinet or the like in a manner such that the appliance can be adjusted relative to the cabinet in vertical, horizontal, and rotational modes.

While the invention has been particularly shown and described with reference to a preferred embodiment thereof, it will be understood by those skilled in the art that various changes in form, details, and application may be made therein without departing from the spirit and scope of the invention. Accordingly, it is intended that all such modifications and changes be included within the scope of the appended claims.

What is claimed as new and is desired to secure by Letters Patent of the United States is:

1. A mounting apparatus for supporting an appliance such as a television set or the like on the undersurface of a structure such as a kitchen cabinet, said mounting apparatus comprising:

a first support element adapted to be secured to said undersurface in a fixed position, said first support element having an opening defined by an arcuate portion having a constant radius and an included angle greater than 180 degrees and an interconnecting portion intermediate the ends of said arcuate portion, the periphery of said opening about said arcuate portion having an upwardly facing rabbet, a second support element secured to said first support element, said second support element including a disk received in said opening, the periphery of said disk comprising an arcuate portion and an interconnecting portion joining the ends of said arcuate portion, the included angle of the arcuate portion of said disk about its center of radius being greater than 180 degrees but less than the included angle of the arcuate portion of said opening, the periphery of the arcuate portion of said disk having downwardly facing rabbet in mating engagement with the upwardly facing rabbet of the periphery of said opening for permitting adjustment of said second support element relative to said first support element about a common vertical axis through an angle determined by the difference between the included angles of the arcuate portion of said opening and the arcuate portion of said disk, said second support element further including a first bracket attached to the lower side of said disk exposed through the opening in said first support element and extending beyond said opening, said bracket having a plurality of spaced-apart vertically downwardly extending blade members, each of said blade members including resilient locking means, and a third support element secured to said second support element, said third support element including a second bracket having a plurality of spaced-apart vertically downwardly extending channel members for receiving said blade members, said channel members each including a plurality of openings for engaging the resilient locking means of a blade element for permitting adjustment of said third support element vertically relative to said second support element, said third support element further including a pair of horizontally disposed and laterally spaced-apart parallel tracks for receiving said appliance, said tracks comprising inwardly facing ribs adapted for sliding reception in complementary outwardly facing grooves in the appliance and a plurality of horizontally spaced-apart detents for cooperating with complimentary detents on the appliance for permitting adjustment of the appliance relative to said third support element in a horizontal direction, whereby an appliance support by said mounting apparatus may be adjusted relative to the undersurface rotationally about a vertical axis and vertically and horizontally relative to the undersurface.

2. A mounting apparatus as defined by claim 1 said channel members each comprising a vertically extending channel having a plurality of vertically spaced-apart slots in a wall thereof and said blade members each comprising a resilient finger movable between a first normally biased position in which said finger is adapted to engage said slots and a second position in which said finger is adapted to clear said slots, whereby said second and third support elements can be vertically adjusted when said finger is moved to its second position and said second and third support elements can be locked together in a selected one of a plurality of relative vertical positions by permitting said finger to move resiliently to its first position to engage a respective one of said slots.

3. A mounting apparatus as defined by claim 1 in which said detents comprise spaced-apart depressions in the upper surface of said ribs for engagement with depending projections from the upper surface of the complementary grooves, the vertical thickness of said ribs being less than the thickness of the complementary grooves less the height of the depending projections, whereby the appliance may be moved horizontally relative to said third support element by raising the appliance sufficiently to lift the depending projections out of said depressions in said ribs.

4. A mounting apparatus as defined by claim 1 in which the included angle of the arcuate portion of said opening is approximately 240 degrees and the included angle of the arcuate portion of said disk is approximately 200 degrees, whereby adjustment about the vertical axis is permitted through an angle of approximately 40 degrees.

* * * * *